UNITED STATES PATENT OFFICE.

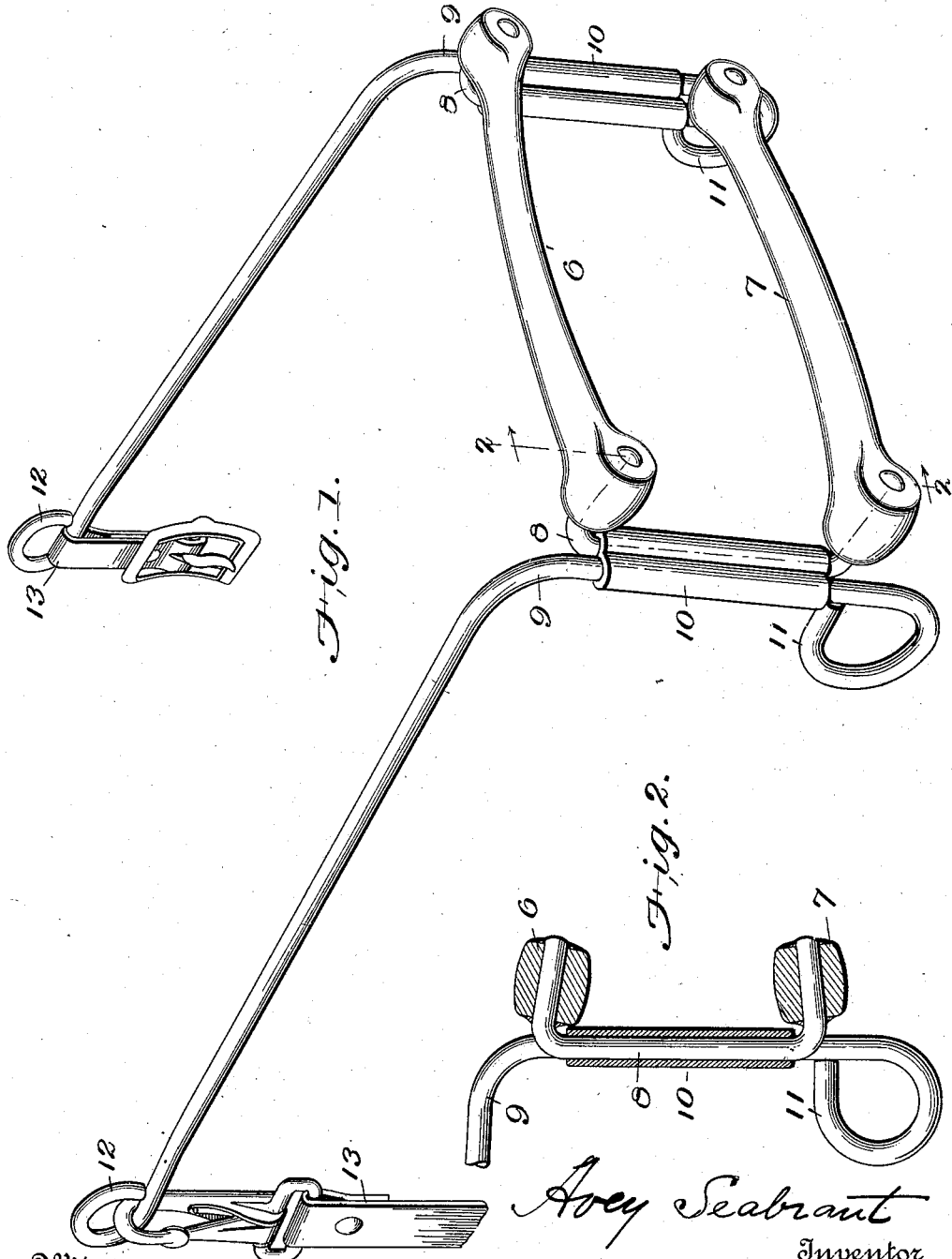

AVEY SEABRANT, OF MOUNDRIDGE, KANSAS.

MOUTH-OPENER FOR ANIMALS.

No. 843,040.  Specification of Letters Patent.  Patented Feb. 5, 1907.

Application filed July 18, 1906. Serial No. 326,786.

*To all whom it may concern:*

Be it known that I, AVEY SEABRANT, a citizen of the United States, residing at Moundridge, in the county of McPherson and State of Kansas, have invented new and useful Improvements in Mouth-Openers for Animals, of which the following is a specification.

This invention is a mouth-opener for veterinary use, designed to hold the mouth of a horse or other animal open for the administration of medicines or for operations upon the teeth or other purposes.

The object of the invention is to produce a simple and improved device of the kind with which the mouth of the animal can be opened and then fastened, so that it cannot be closed.

A further object is to provide a device having movable or adjustable parts, so that it may be made to fit the head of an animal of any kind, such as a horse, cow, or mule.

The invention is illustrated in the accompanying drawings, in which—

Figure 1 is a perspective view thereof, and Fig. 2 is a section on the line 2 2 of Fig. 1.

The device comprises a pair of curved bit-bars 6 and 7, which are connected and spaced apart by bars 8, extending between the bits at each end thereof and rigidly secured thereto, as by soldering the ends of the bars in the eyes at the ends of the bits. These bars space the bits apart and hold the mouth of the animal open, with one bit bearing against the roof of the mouth and the other against the floor thereof and the tongue.

At 9 are indicated side bars which have a hinge or pivotal connection with the spacing-bars 8 by means of the sleeves 10, which are soldered or otherwise fixed to the spacing-bars, which extend therethrough. The lower ends of the side bars 9 are bent substantially at right angles with the remainder of the bars and said lower ends extend loosely through the sleeves, so that they will turn therein to allow the bars to be swung in or out. By this means the device may be fitted or applied to animals having heads of different widths or sizes. At the lower ends the bars terminate in loops 11, which press against the lips of the animal at opposite sides, and thereby prevent the bits from getting out of place or slipping sidewise out of the mouth of the animal. At the upper ends the side bars have loops 12 for the attachment of a strap 13.

In use the bits are slipped flatwise into the mouth of the animal, and then by pulling on the upper ends of the side bars a leverage is produced which opens the mouth of the animal and turns the bits crosswise therein, thereby holding the mouth open. In this position the side bars extend up beside the jaws of the animal, and by placing the strap 13 over the animal's neck the instrument is held in place and position. The opening between the bits is not obstructed, so that the teeth can be readily got at or medicines given.

I claim—

1. A mouth-opener comprising a pair of bit-bars rigidly connected and spaced apart, and laterally-swinging side bars pivotally connected to the bit-bars and provided with a fastening-strap.

2. A mouth-opener comprising a pair of bit-bars, spacing-bars at each side fixed between the ends of the bit-bars, side bars bent to form lower portions extending parallel to the spacing-bars and having a pivotal connection thereto permitting lateral swing of the side bars, and a fastening-strap connected to the upper ends of the side bars.

In testimony whereof I have signed my name to this specification in the presence of two subscribing witnesses.

<p style="text-align:center">her<br>AVEY × SEABRANT.<br>mark.</p>

Witnesses:
 D. B. MOORE,
 J. H. PATTER.